Aug. 4, 1942.   P. R. CARLTON   2,291,876
PISTON RING
Filed Dec. 6, 1939   2 Sheets-Sheet 1

INVENTOR
PAUL R. CARLTON
BY
ATTORNEY

Aug. 4, 1942.   P. R. CARLTON   2,291,876
PISTON RING
Filed Dec. 6, 1939   2 Sheets-Sheet 2

INVENTOR
PAUL R. CARLTON
BY
ATTORNEY

Patented Aug. 4, 1942

2,291,876

UNITED STATES PATENT OFFICE 2,291,876

PISTON RING

Paul R. Carlton, St. Louis, Mo., assignor to Charles C. Wenkel, Columbus, Ill.

Application December 6, 1939, Serial No. 307,906

4 Claims. (Cl. 309—45)

This invention relates to a certain new and useful improvement in piston rings and has for its primary objects the provision of a composite piston ring comprising co-operable spring-steel members so constructed to accurately conform to the circular contour of the cylinder wall and piston grooves, which provides a unique explosion-tight seal, maintaining improved bearing surface between the piston and cylinder wall, which perfectly conforms to circular shape despite wear and abrasion, which has a continuous cylinder wall-engaging surface around the entire periphery of the cylinder wall, which is extremely economical in cost of manufacture, which is unusually rugged and durable, and which is highly efficient in the performance of its stated functions.

And with the above and other objects in view, my invention resides in the novel features of form, construction, arrangement, and combination of parts presently described and pointed out in the claims.

In the accompanying drawings (2 sheets):

Figure 1:
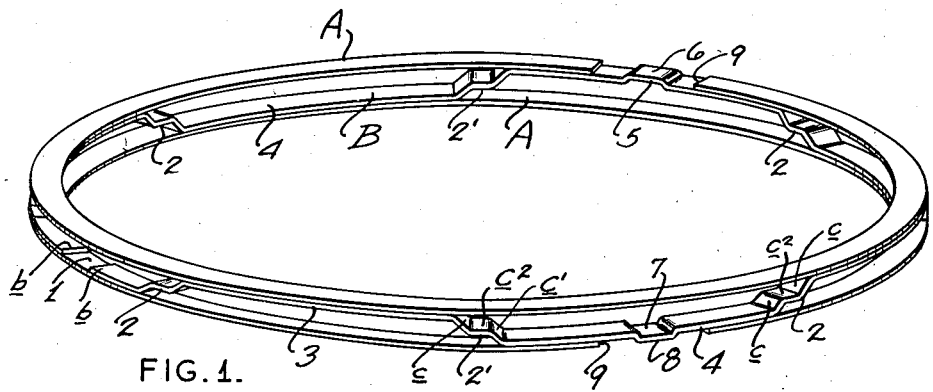
Figure 1 is a perspective view of a composite piston ring embodying my present invention.

Referring now in more detail and by reference characters to the drawings, which illustrate a preferred embodiment of my invention, the composite ring includes two identically shaped or companion outer annuli or members A and an intermediate or spacing member B.

Figure 2:
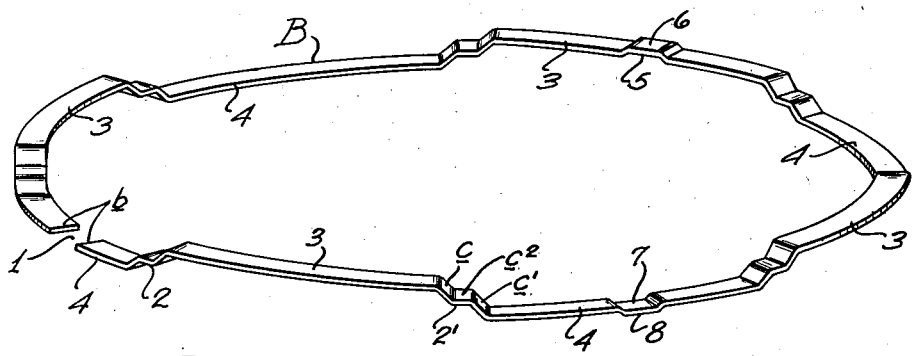
Figure 2 is a perspective view of the intermediate member of the ring of Figure 1.
Figure 3:
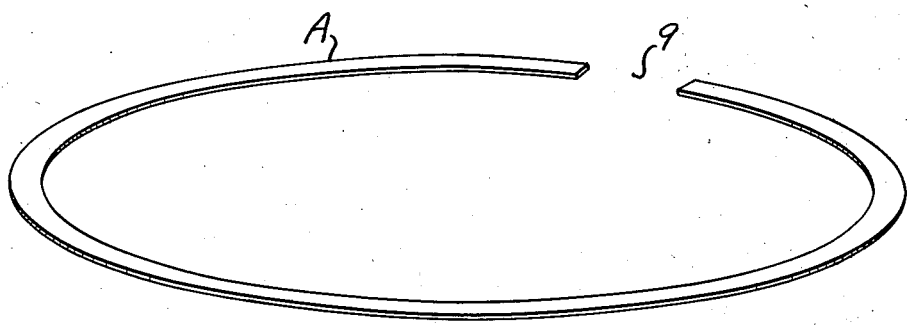
Figure 3 is a perspective view of one of the two outer identical spring-steel members of the ring.

The intermediate member B is preferably constructed and rolled from ribbon steel and is of split type, having a gap, as at 1, of such size and dimension as to permit the free ends $b$ of the member B to come into substantially abutting engagement upon ring compression for snug-fitting disposition within the ring-groove of the piston. Intermediate its free ends $b$ and around its entire circumferential extent, the member B is corrugated, that is to say, axially deformed out of a flat plane to integrally include a plurality of circumferentially spaced alternate so-called upwardly and downwardly disposed or converging step-like bends or flexure portions 2, 2', respectively, each comprising spaced oblique sections $c$, $c'$, and intermediate flat section $c^2$. In turn, intermediate such step-like flexure portions 2, 2', the ring member B includes an upper and lower series of substantially co-planar flat sections 3, 4, alternating about the ring, as best seen in Figure 2.

One of the upper flat sections 3 is centrally provided with an upwardly deformed protuberance or positioning step 5 having an upwardly presented flat face, as at 6, disposed in a plane spaced upwardly from the upper face of the remainder of such flat section 3 by a distance substantially equal to the thickness of an outer component member A. Similarly, one of the lower flat sections 4 is provided with a downwardly deformed positioning step 7 having a downwardly presented flat face, as at 8, positioned in a plane spaced from the downwardly presented face of such lower section 4 also by a distance substantially equal to the thickness of an outer annulus A.

Figure 4:
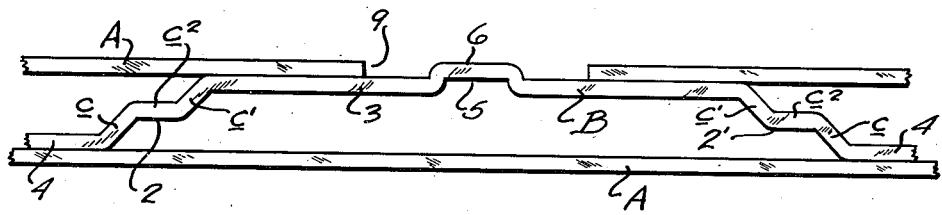
Figures 4 and 5 are fragmentary elevational views of the ring, illustrating in detail the joint-forming ends of the members thereof.
Figure 5:
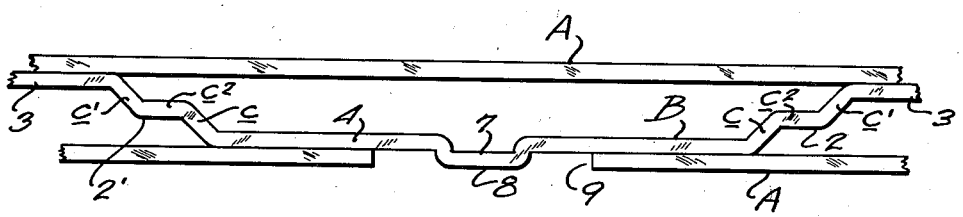
Figure 6:
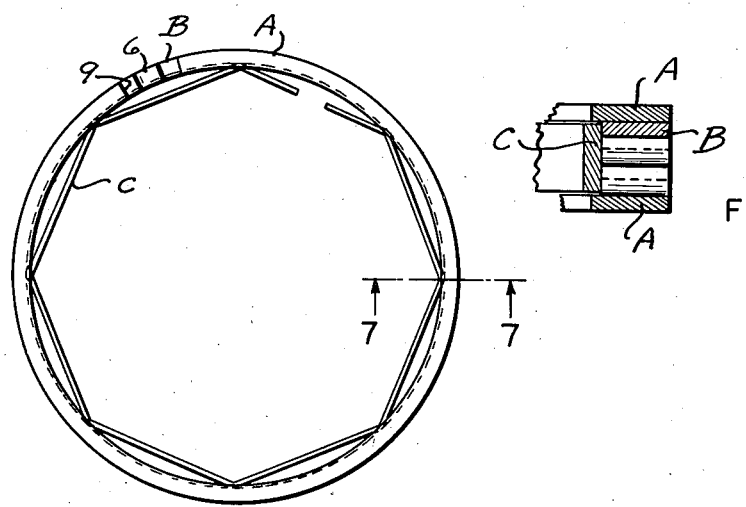
Figure 6 is a plan view of the ring and a co-operating ring expander.

The outer members or annuli A are each likewise rolled from flat ribbon steel preferably of slightly greater width than the intermediate member B and are of the split type, having a gap, as at 9, of substantially greater circumferential length than the circumferential length of the positioning steps 5, 7. When the intermediate member B and a pair of outer members A are assembled in the formation of the composite ring of Figure 1, the gaps 9 will loosely embrace the positioning steps 5, 7, respectively, and thereby permit a limited rotary shifting of the outer members A with respect to the intermediate member B and to each other, all as best seen in Figures 4 and 5.

Figure 7:
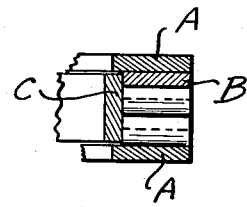
Figure 7 is a fragmentary transverse sectional view of the ring and expander, taken approximately along the line 7—7, Figure 6.

A spring steel ring expander C of polygonal shape and having a transverse width substantially equal to the perpendicular distance between the outwardly presented faces, respectively, of the upper and lower flat sections 3, 4, of the intermediate ring member B may be employed, as shown, so that, when assembled, with the composite piston ring installed in a piston ring groove, the expander C will fit between the opposed inner faces of the outer members A and force the intermediate ring member B outwardly into cylinder wall engagement, substantially as shown in Figure 7.

Piston rings made in accordance with the present invention have been found to be exceedingly durable by reason of the fact that they may be fabricated entirely from spring-steel ribbon, rather than from cast metal. This provides a ring in which there is less crystallization, more malleability, and less surface hardness. Consequently, a piston ring made according to the present invention engages the cylinder wall surface tightly without danger of any resulting scoring or other damage. Further, piston rings made according to the present invention are far more leakproof than piston rings which have been manufactured up to the present time, so far as I am aware. This is thought to be largely attributable to the unique type of lap-joint provided, since the present invention provides a ring which has a continuous circumferential contact with the cylinder wall.

The present ring also provides for a greater number of oil-scraping edges, so that the lubricants which splash up on to the sides of the cylinder wall during normal motor operation will be much more efficiently scraped down from the sides of the walls and returned to the crank case. The so-called corrugations of the intermediate member B also provide oil drainage channels or passages for permitting the lubricant to flow radially into the oil ports extending through the piston wall.

Finally, the corrugated formation of the intermediate member B and particularly the step-like flexure portions 2, 2', having flat intermediate sections $c^2$, provide axial resiliency, that is to say, normally urges the two outer members snugly against the lands of the ring-groove and yet, when necessary, permit the two outer members A to be moved toward each other. However, during such movement the outer members A are substantially maintained in parallel planes due to the stabilizing effect of the flat sections 3 and, in turn, permitting circumferential movement, and consequent radial enlargement, of the intermediate member B. Thus, when the composite ring is subjected to sudden excessive axial stresses, such as, for instance, are imposed at the top of the piston stroke, the ring yields slightly, thereby lessening the disruptive effect of the shock upon the scraping edges of the outer ring-members A and upon the cylinder walls and, at the same time, causing the intermediate member to enlarge radially or "squeeze out," as it may be said, for momentarily increasing the compression-sealing function of the ring.

If desired, I may also fabricate the outer annuli or split-ring members A from cast-iron, in which case the axial thickness of each of such members preferably should be about twice the thickness of the ribbon-steel intermediate member B. Similarly, the distance or so-called height to which the positioning steps 7 are struck up should approximately be equal to the thickness of the cast-iron outer annuli or split-ring members A.

It should be understood that changes and modifications in the form, construction, arrangement, and combination of the several parts of the ring may be made and substituted for those herein shown and described without departing from the nature and principle of my invention.

Having thus described my invention, what I claim and desire to secure by Letters Patent is:

1. A composite piston ring comprising an intermediate annular member integrally including a plurality of pairs of converging step-like bends offset out of the main plane of the ring and joined by a long flat section disposed in a plane parallel to the main plane of the ring, and a pair of flat steel annular members disposed flatwise and concentrically upon the oppositely presented flat faces of the intermediate member.

2. A composite piston ring comprising an intermediate annular member integrally including a plurality of pairs of short converging step-like sections at their outer ends connected by relatively long flat sections alternately disposed in spaced parallel planes in the provision of two series of oppositely presented flat faces, and a pair of flat steel annular members disposed flatwise and concentrically upon the oppositely presented flat faces of the intermediate member.

3. A composite piston ring comprising an intermediate annular member integrally including a plurality of pairs of converging step-like sections each comprising two spaced oblique portions connected by a short flat section, said oblique portions being at their outer ends connected by elongated flat sections disposed in spaced planes parallel to the plane of the short flat section in the provision of two series of oppositely presented flat faces, and a pair of flat steel annular members disposed flatwise and concentrically upon the oppositely presented flat faces of the intermediate member.

4. A composite piston ring comprising an intermediate annular member integrally including a plurality of pairs of converging step-like sections each comprising two spaced oblique portions immediately connected by a flat portion, said step-like sections being at their outer ends joined by elongated flat sections disposed in spaced planes parallel to the plane of the flat portion in the provision of two series of oppositely presented flat faces, and a pair of cast-iron annular members disposed flatwise and concentrically upon the oppositely presented flat faces of the intermediate member.

PAUL R. CARLTON.